Aug. 6, 1929.  R. W. CAMMACK  1,723,842
DENTAL FLOSS HOLDER
Filed Oct. 30, 1928
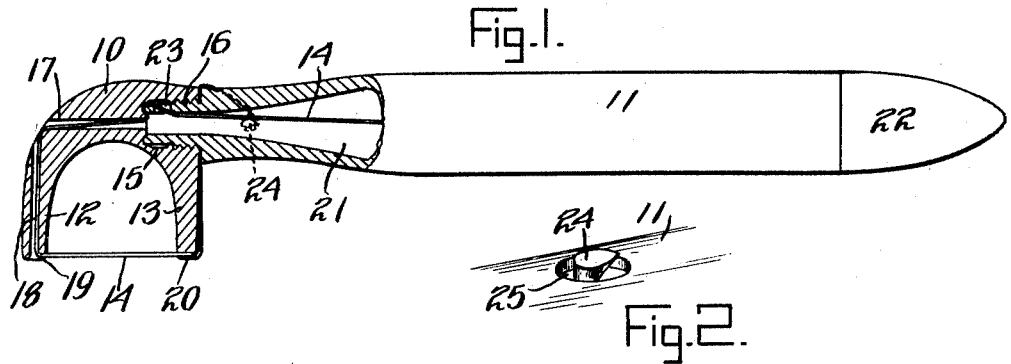
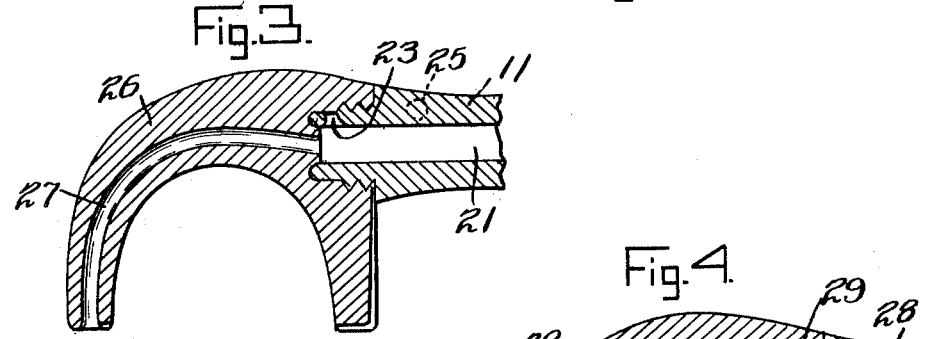
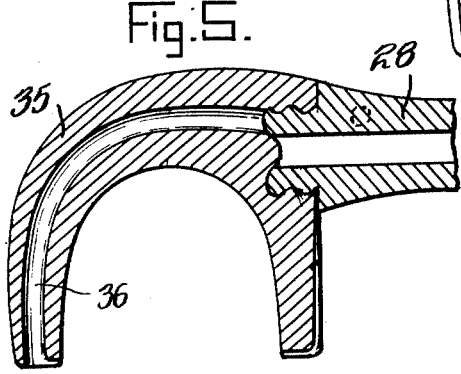
Inventor
Robert W. Cammack Patented Aug. 6, 1929.

1,723,842

UNITED STATES PATENT OFFICE

ROBERT WALTER CAMMACK, OF NEW YORK, N. Y.

DENTAL FLOSS HOLDER.

Application filed October 30, 1928. Serial No. 315,993.

My invention relates to dental floss holders designed for holding a strand of dental floss taut and in a convenient manner to be readily inserted between the teeth for removing food particles and the like lodged therebetween. The present invention is an improvement over that shown shown in my prior patent #1,588,307, granted June 8, 1926. Among the objects of the present invention is to provide a simplified device of this character wherein none of the floss comes in contact with the holder after it has been soiled or used, and also to provide a more conveniently located cut-off, all as will be hereinafter more specifically described and claimed.

Referring to the accompanying drawings, which are made a part hereof and on which similar reference characters indicate similar parts, Figure 1 is an enlarged part sectional part elevational view, Figure 2, an enlarged detail, Figures 3, 4 and 5, enlarged longitudinal sectional views of modified forms.

As shown in the drawings my invention comprises a curved body or head 10 and a hollow handle 11 which forms a magazine for dental floss. The curved body or head 10 is provided with spaced projections or prongs 12 and 13 across the extremities of which a strand of dental floss 14 is adapted to be tightly stretched. The curved body or head 10 is provided with an internally threaded receiving socket 15 for the reception of the reduced externally threaded extremity 16 of the handle 11, the bottom of the socket and the extremity of the handle being complementarily formed for engaging and firmly holding dental floss therebetween.

The holder 10 is provided with an opening or passage 17 for dental floss which is disposed in alignment with the handle and terminates at the exterior of the head on the side remote from said handle. A passage 18 is located substantially at right angles to the passage 17 and terminates at the extremity of the prong 12. The inner portion of the extremity of the prong is provided with a groove 19 which is in alignment with a groove 20 in the opposite prong 13 in order to maintain the floss in proper position when it is drawn across the co-operating prongs. The handle 11 is provided with a hollow interior 21 for receiving the dental floss, and in order to facilitate the insertion of the floss into the handle the rear end of the handle is provided with a removable closure plug or cap 22.

The reduced threaded portion 16 of the handle is provided with a transverse aperture 23, which enables the floss to be threaded outwardly through said aperture and around the end of the handle where it may be clamped tightly in position between the end of the handle and the bottom of the receiving socket 15.

In threading the device for use, floss is inserted in the rear end of the handle by removal of the cap 22ª and with the handle separated from the head the floss is threaded laterally through the aperture 23 over the threads of the projecting end 16 and through the longitudinal passageway 17 to the exterior of the head. It is next threaded through the transverse passage 18 to the extremity of the prong 12, across to the opposed prong 13 and caught between the shoulder on the handle and the abutting surface of the head as the handle is screwed into the head. The reduced portion of the handle is slightly longer than its receiving socket in order to permit the floss to be engaged between the end of the handle and the socket before it is received between the shoulder on the handle and the head. The floss may be pinched at both ends simultaneously or at the point of entering slightly before it is pinched at the other end after it has crossed the space between the prongs. On account of it being caught between the end of the handle and the head the floss is prevented from further pulling out of the handle and by being caught between the shoulder on the handle and the head the other end is held so that the floss is maintained tightly stretched across the co-operating prongs 12 and 13 in a position to be most advantageously used. The grooves 19 and 20 prevent the floss from slipping off the ends of the prongs out of the above described position. When the device is threaded the floss may be advanced by giving the handle substantially a quarter turn to loosen the same or to relieve the clamping action between the end of the handle and the head, whereupon the end of the floss may be pulled to perform the advancing action and the handle tightened by screwing into the head, when the device is again ready for use. It is not necessary to re-thread until the floss is exhausted or becomes broken, and it is never necessary to handle the floss prior to its use, but after it has been used it can be cut off and discarded.

As shown in Figure 2, I have provided a cut-off pin 24, located in a depression 25, in the handle. The cut-off pin is preferably located in close proximity to the head and has its top flush with the surface of the handle, so that substantially the only portion of the floss exposed is the portion intended to be inserted between the teeth.

In the modified forms of the invention illustrated in Figs. 3, 4 and 5, I have shown different forms of connections between the handle and the head, with different arrangement of passages for the floss relative to the head.

In Fig. 3 the same type handle is used as in Fig. 1, but with a slightly modified form of head. Instead of having two straight passages for the floss disposed at right angles, I have shown a curved passage 27 which conforms in curvature substantially to the curvature of the head 26.

In Fig. 4 I have illustrated a handle 28 of slightly modified form, which includes a slightly different type of thread on a reduced extending threaded portion 29, with a socket or flared mouth portion adapted to receive a convex projection 30 on the head 31. The head 31 is provided with a longitudinal passage 32 disposed in off-set relation to the passage of the handle, whereby the floss may be clamped firmly where it emerges from the handle. The head is provided with a curved groove 33 disposed along the exterior of the leg 34 of the head, so that the floss is exposed at the remote side of each of the legs of the head.

In Fig. 5 I have shown a head 35 similar to that of Fig. 3, but formed for the reception of the handle 28 shown in Fig. 4. Such head being identical to that shown in Fig. 4, with the exception of the floss passage 36, which is curved similar to the passage 27 of Fig. 3.

It will be obvious to those skilled in the art that various changes may be made in my device without departing from the spirit of the invention, and I, therefore, do not limit myself to what is shown in the drawings and described in the specification, but only as set forth in the appended claims.

Having thus fully described my said invention, what I claim as new and desire to secure by Letters Patent, is:

1. A dental floss holder comprising a head having spaced transversely disposed prongs, one of said prongs being provided with a straight side surface forming the extremity of the head, a socket in said straight side surface of the head, a passage from the socket to the extremity of the other prong, a floss carrying handle threaded into said socket and having a shoulder, and floss clamped by the handle against the socket in the head and extending through the head across the prongs and having its end clamped between the shoulder of the handle and the flat surface of the head, substantially as set forth.

2. A dental floss holder comprising a head having a pair of spaced prongs, a socket in said head at the outer side of one of the prongs, the outer side of the prong adjacent said socket being relatively straight, a passage through the head from said socket to the extremity of the remote prong, and a handle threaded into said socket, substantially as set forth.

3. A floss holder comprising a head having spaced prongs, a handle connected to the head at the base of one of the prongs, dental floss extending through said head to the forward prong and across said prongs and clamped between the handle and the head adjacent the rearmost prong, said floss being adapted to be advanced through the head and across from the forward to the rear prong and cut off as it is used, whereby used floss is prevented from contact with the holder, substantially as set forth.

4. A holder for dental floss comprising a head having a pair of spaced prongs and a socket for the reception of a handle, a handle having a portion adapted to enter the socket in the head, said handle being provided with a pocket for the reception of dental floss, a passage in said head from the bottom of the socket to the extremity of the remote prong, whereby dental floss may be threaded from the interior of the handle through the passage in the head across the prongs and engaged between the handle and the head in position to be clamped firmly in place, substantially as set forth.

5. A dental floss holder comprising a head having a pair of spaced prongs, a floss carrying handle attached to said head, means for detachably connecting the handle to the head, a passageway for dental floss extending through the head from the point of contact between the handle and the head, dental floss in the handle extending from the point of contact between the handle and the head and forwardly through the said passageway and rearwardly to a position to be clamped between the abutting surfaces on the head and the handle, the floss being advanced through the handle prior to its use and adapted to be cut off after it is used thereby preventing soiling of the holder, substantially as set forth.

In witness whereof, I have hereunto set my hand at New York, New York, this 24th day of October, A. D. nineteen hundred and twenty-eight.

ROBERT WALTER CAMMACK.